United States Patent [19]

Jouffroy et al.

[11] Patent Number: 4,474,931
[45] Date of Patent: Oct. 2, 1984

[54] ENERGY-SAVING PROCESS FOR MANUFACTURING POLYETHYLENE AND THE RELATED MANUFACTURING DEVICE

[75] Inventors: Guy Jouffroy, Saint Arnoult; Bernard Martinot, Lillebonne, both of France

[73] Assignee: Societe Chimique des Charbonnages-CdF Chimie, Paris, France

[21] Appl. No.: 397,124

[22] Filed: Jul. 12, 1982

Related U.S. Application Data

[60] Continuation of Ser. No. 212,233, Dec. 12, 1980, abandoned, which is a division of Ser. No. 16,540, Mar. 1, 1979, abandoned.

[30] Foreign Application Priority Data

Mar. 2, 1978 [FR] France .................... 78 06030

[51] Int. Cl.³ .......................... C08F 2/34; C08F 6/00
[52] U.S. Cl. .................................. 526/88; 422/134; 526/68; 528/501; 528/502
[58] Field of Search ............ 528/501; 60/648, 689; 526/68, 88; 415/202; 422/132, 133, 134, 135, 136

[56] References Cited

U.S. PATENT DOCUMENTS

| | | | |
|---|---|---|---|
| 1,448,893 | 5/1923 | Wiki | 415/202 |
| 1,858,043 | 5/1932 | Glass | 415/202 |
| 2,013,087 | 3/1935 | Cornell, Jr. | 415/202 |
| 2,733,044 | 1/1956 | Danel | 415/202 |
| 3,649,208 | 3/1972 | Hornschuch | 422/134 |
| 3,879,949 | 4/1975 | Hays | 60/649 |
| 4,105,842 | 8/1978 | Nicco | 526/65 |
| 4,106,294 | 8/1978 | Czaja | 60/649 |
| 4,191,821 | 3/1980 | Gloriod | 528/501 |

FOREIGN PATENT DOCUMENTS

| | | | |
|---|---|---|---|
| 1168363 | 12/1958 | France | 422/134 |
| 56620 | 7/1968 | Luxembourg | 422/134 |

Primary Examiner—Christopher A. Henderson
Attorney, Agent, or Firm—Finnegan, Henderson, Farabow, Garrett & Dunner

[57] ABSTRACT

Polyethylene is produced in at least one reactor under a pressure of 800 to 2500 bars and a temperature of 150° to 350° C., and the reaction mixture exiting the reactor through an expansion valve and supplied to a separator under a pressure of 50 to 400 bars is cooled by passing a flow Q of the mixture through a turbine. The turbine comprises at least one stage with a fixed nozzle and a bladed wheel having a rotation speed of between 12,000 and 40,000 r.p.m. Ethylene discharged from the separator is recycled to the inlet of a compressor, and the discharge from the compressor is supplied to the reactor.

20 Claims, 5 Drawing Figures

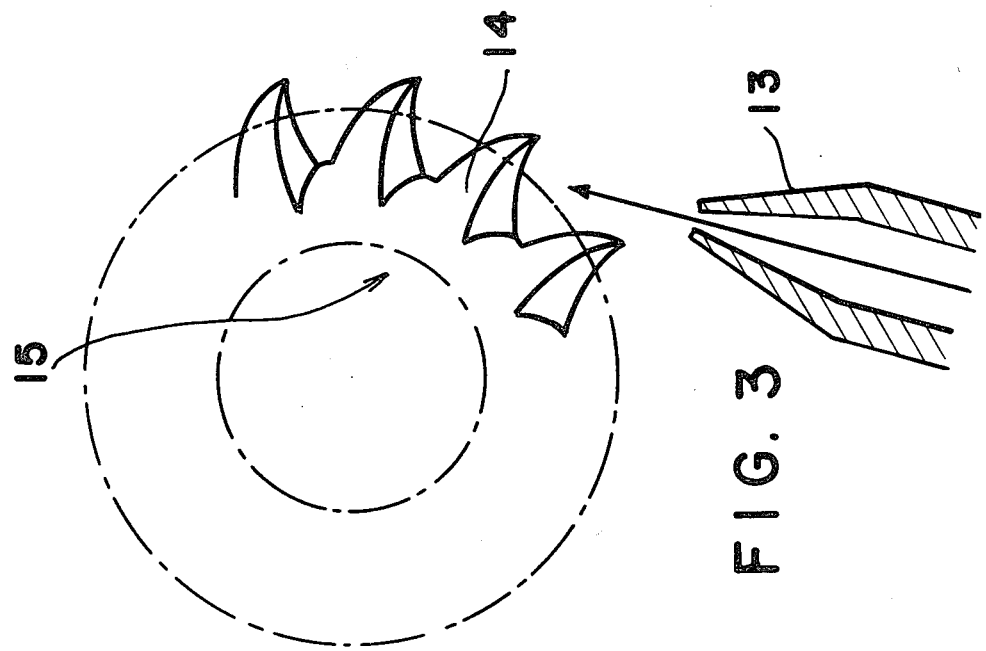
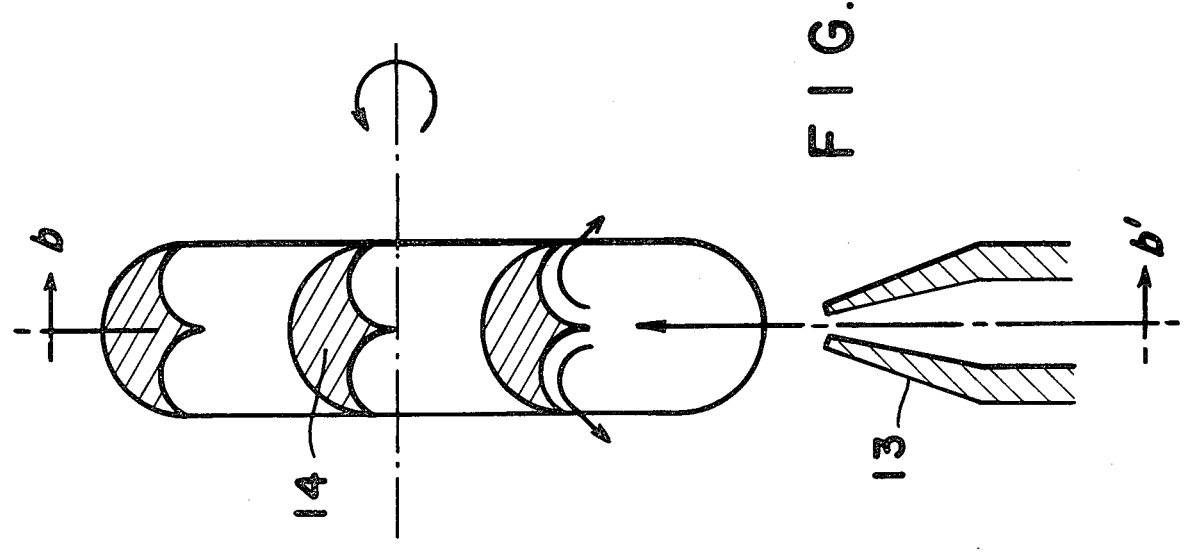

ENERGY-SAVING PROCESS FOR MANUFACTURING POLYETHYLENE AND THE RELATED MANUFACTURING DEVICE

This is a continuation of application Ser. No. 212,233, filed Dec. 12, 1980, now abandoned, which was a division of application Ser. No. 16,540, filed Mar. 1, 1979, now abandoned.

BACKGROUND OF THE INVENTION

The present invention relates to a process for the manufacture of polyethylene, and in particular to a process by which the major part of the enthalpy decrease available between the polymerisation reactor and the separator in which the polyethylene is separated from the ethylene can be recovered.

It is known that because of the increasing cost of energy, reduction in energy consumption has become of primary concern in industry. Despite this, very little effort has hitherto been dedicated to reducing energy consumption in installations for the manufacture of polyethylene, in which the reaction takes place under a very high pressure which is generally above about 800 bars. The enthalpy decrease available between this reaction pressure and the separation pressure, which is generally below 400 bars, is not usually recovered. U.S. Pat. No. 3,649,208 describes a process for compressing a fluid which consists in using a plurality of powered means for compressing fluid to effect production of a product, in admitting fluid and at least one constituent to said powered means, in causing a reaction to occur between said one constituent and fluid to initiate formation of the product from a portion of the fluid, in supplying means with a portion of the energy stored in said compressed fluid for powering given means of said plurality, and in separating the product from the remaining fluid. This process does apply to the manufacture of polyethylene and discloses a turbine as an example of means supplied with a portion of the energy stored in the compressed fluid. However it makes it possible to provide only up to 50% of the energy required for compressing the fluid, and, furthermore, the practical means for carrying out this process in industry and the operating conditions of these means are not described. Finally, this process involves a well-known restriction which consists in using all the recovered energy inside the installation for the manufacture of polyethylene.

SUMMARY AND DETAILED DESCRIPTION OF THE PREFERRED EMBODIMENTS OF THE INVENTION

It is an object of this invention to provide a process for the manufacture of polyethylene in which the major part of the enthalpy decrease available between the polymerisation reactor and the separator is recovered in such a way that it can be used independently of the polymerisation installation, and in which the means for recovering the enthalpy decrease simultaneously cool the mixture issuing from the reactor before it enters the separator.

According to the invention there is provided a process for the manufacture of polyethylene in at least one reactor under a pressure of 800 to 2,500 bars and at a temperature of 150° to 350° C., in which the mixture leaving the reactor through an expansion valve is supplied to a separator under a pressure of 50 to 400 bars and undergoes cooling between the valve and the separator, wherein the cooling is effected by passing a flow Q of the mixture leaving the reactor through a turbine consisting of at least one stage successively comprising a fixed nozzle and bladed wheel having a rotation speed of between 12,000 and 40,000 revolutions per minute, the mixture leaving the last stage of the turbine being supplied to the separator.

BRIEF DESCRIPTION OF THE DRAWINGS

FIG. 2 is a schematic representation of a turbine that can be used in the present invention.

FIG. 3 is a schematic representation of the turbine of FIG. 2 along the axis b—b'.

When the turbine used in the above process comprises a single stage, the nozzle of the turbine must have a neck cross-section S such that $$\frac{Q}{S} = \frac{P + 230}{2,160},$$

P being the pressure of the mixture leaving the reactor and entering the turbine. (P is expressed in atmospheres, Q in metric tons per hour and S in square millimeters). Regardless of the number of stages, the wheels of the turbine can have different diameters, although identical diameters represent the simplest solution. In any case, these diameters should be chosen so that the peripherical speed of the wheel is always between 100 and 450 m/second. The turbine can advantageously be connected, via a speed reducer, to an electricity generator, driven at a rotation speed of 3,000 revolutions per minute, for the production of industrial current. Thus it is possible to use the recovered enthalpy decrease independently of the polymerisation installation.

Figure 5:
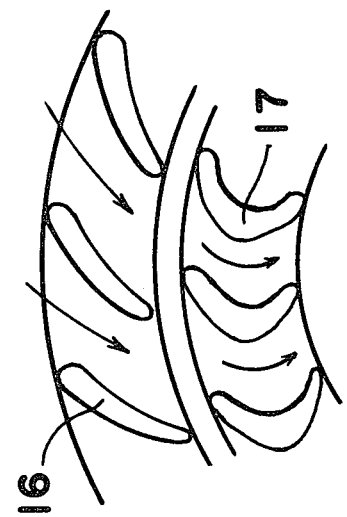
FIG. 5 is a schematic representation of the turbine of FIG. 4 along the axis b—b'.
Figure 4:
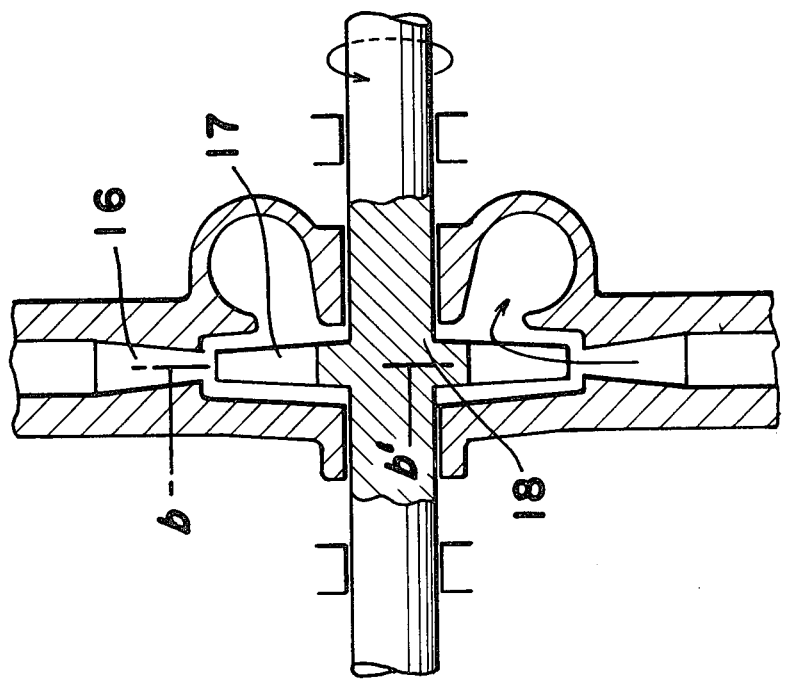
FIG. 4 is a schematic representation of another type of turbine that may be used in the present invention.

The choice of turbines which can be used in this invention is made difficult by the nature of the mixture conveyed between reactor and separator, which, when expansion has ended, consists of ethylene and droplets of polyethylene. This cannot be made by analogy with steam turbines because, in the case of a mixture of steam and water droplets, the ratio of specific gravities is about 1,000, whereas, under the temperature and pressure conditions prevailing between the expansion valve and the separator, the ratio of specific gravities can vary but is always less than about 5. However, several types of turbine can be used. Of course every such turbine includes a rotor, about which further discussion is unnecessary. In the context, reference is made to Perry's Chemical Engineering Handbook, (4th Edition, 1963), pages 24-70 to 24-77, and to Techniques de l'Ingénieur, Mécanique et Chaleur, Vol. 2, pp, B 310-1 to B 322-9 and B 460-1 to B 462-17 (1965), for the terminology applied to these machines. The first type of turbine which can be used in this invention is a radial-inflow turbine having a reaction ratio less than or equal to $\frac{1}{2}$ frequently denoted by the name Francis turbine and comprising one or more stages, preferably 4 to 12 stages. Such a turbine is schematically represented in FIG. 2 and, along the axis b—b' of the latter, in FIG. 3. In these drawings, 13 designates the nozzle, 14 a blade of the wheel and 15 the rotor. The second type of turbine which can be used is a turbine with a single quasi-radial jet, frequently denoted by the name Pelton turbine. In this type of turbine, the jet of mixture issuing from the nozzle is located in a plane which is perpendicular to the axis of the bladed wheel but is not concurrent with the axis. This turbine is schematically represented in FIG. 4 and, along the axis b–b′ of the latter, in FIG. 5. In these drawings, 16 designates the nozzle, 17 a blade of the wheel and 18 the rotor. The third type of turbine which can be used is an axial-flow impulse turbine, comprising one or more stages, the angle of injection of the mixture, relative to the bladed wheel, being preferably less than 30 degrees. When using a turbine of the second or third types mentioned above, it can be advantageous to pass the mixture onto only some of the blades on the wheel, this technique being denoted by the term partial injection.

The turbine nozzle used in the above process is preferably a nozzle of the convergent-divergent type, in which the ratio (S′/S) of the outlet cross-section S′ of the divergent part to the neck cross-section S is between 1 and 2. The nozzle can be rectangular or a body of revolution. It can be advantageous to use a nozzle of variable area, such as is provided by a body of revolution provided internally with a conical-tipped rod engaged in the neck of the nozzle and controlled by a hydraulic servomotor. It is thus possible to regulate the turbine feed rate directly and it is even possible, by engaging the rod completely until the cone forms a seal on the neck of the body of revolution, to cut off the flow of drive fluid rapidly and completely, as required by safety regulations in the event of mechanical breakdown. Also, for safety reasons, the turbine according to the invention preferably comprises at least one overspeed detecting means that is able to cause closing in a very short time, e.g. between 0.01 and 0.1 second, of the valve at the outlet of the reactor.

In the process according to the invention, the flow Q of mixture passing through the turbine does not necessarily represent the total flow of fluid leaving the reactor. However, in order to achieve the object of the invention and to use the turbine under the best conditions of efficiency, this flow Q must represent a major part, preferably at least 60%, of the flow leaving the reactor.

The remaining part of the mixture, which represents up to 40% of the flow leaving the reactor, is led through a line arranged in parallel with the turbine from the outlet of the reactor to the separator, either directly through an expansion valve or through a cold ethylene injector in accordance with the process of French Pat. No. 2,313,399, thus making it possible to achieve additional cooling of the mixture at the inlet of the separator. Quite obviously, the proportion of the mixture passed into this injector may have to be modified with time, as a function of the polymerisation conditions or in the event of shutdown of the turbine, and provision is therefore made to regulate the passage of the mixture into the injector by means of a valve. Cold ethylene feeding the injector is either taken, downstream of a heat exchanger, from the recycle line extending from the separator to a compressor provided for supplying the reactor with ethylene, or directly supplied from a distribution circuit under the desired pressure. In both cases, it is advantageous, for energy reasons, that the cold ethylene injection pressure is as low as possible; the pressure is preferably between 20 and 180 bars.

Furthermore, a particular embodiment of the invention consists of passing the flow Q of mixture leaving the last stage of the turbine through a cold ethylene injector, before it is supplied to the separator, in order to effect additional cooling of the mixture. The injector used may be of the convergent-divergent type described in French Pat. No. 2,313,399 and will be fed as indicated above.

The process according to the invention can be applied to the polymerisation of ethylene under high pressures between 800 and 2,500 bars, using a free radical yielding initiator or using a catalytic system of the Ziegler type. The invention can also be applied to the copolymerisation of ethylene with α-olefines such as propylene, but-1-ene or hex-1-ene.

When employing a free radical yielding initiator, the invention can be applied to the copolymerisation of ethylene with polar comonomers such as carbon monoxide, maleic anhydride and vinyl esters.

As is well known, it is also possible to use, in the process of the invention, one or more chain transfer agents, such as, for example, hydrogen, in order to regulate and control the characteristics of the polymer. The reaction mixture may also contain an inert diluent such as, for example, an aliphatic hydrocarbon.

The term "free radical yielding initiator" is to be understood as meaning oxygen, peroxides and peresters. The term "catalytic system of the Ziegler type" means a system comprising at least one activator selected from hydrides and organometallic compounds of a metal of group I to III of the Periodic Classification and on the other hand at least one halogentated compound of a transition metal of groups IV to VI A. Among these compounds may be cited vanadium and titanium trichlorides (the latter eventually syncrystallized with aluminum chloride in the form of $TiCl(1/33)\ AlCl_3$) eventually laid on a support comprising for example a halide, monohalide or a hydrohalide of magnesium. The mean residence time of the initiator or the catalytic system in the reactor, generally ranging from 5 to 80 seconds, will be easily selected by those skilled in the art in relation with the temperature in the reactor and will be shorter as the temperature is higher. These catalysts are preferably employed in the form of solutions in an inert diluent or, alternatively, in the form of a dispersion.

The process of the invention is intended to be carried out continuously and can be effected using a stirred autoclave reactor, or, alternatively, a tubular reactor.

This invention also relates to an apparatus for polymerizing ethylene, comprising a reactor, a turbine arranged at the outlet of the reactor and consisting of at least one stage successively comprising a fixed nozzle and a bladed wheel, a separator disposed at the outlet of the last stage of the turbine and comprising an outlet at its lower end for discharging the polymer, and ethylene recycle line extending from the separator to the inlet of a compressor and a line extending from the outlet of the compressor to the inlet of the reactor.

If the flow issuing from the reactor is not entirely passed through the turbine, the apparatus according to the invention further comprises a line arranged in parallel with the turbine from the outlet of the reactor to the separator and comprising an expansion valve. In this case, the apparatus of the invention may further comprise an injector comprising a convergent ejection nozzle arranged at the end of the line extending from the expansion valve, a convergent mixing zone downstream from the ejection nozzle and connected to a cold ethylene supply means, and a diffuser at the downstream end of the mixing zone and connected to the separator inlet. From the energetic standpoint, the mixing zone of the injector should advantageously be connected, through a heat exchanger and eventually an expansion valve, to the ethylene recycle line.

According to another embodiment, the apparatus of the invention may further comprise an injector as described above and arranged between the outlet of the last stage of the turbine and the inlet of the separator.

Figure 1:
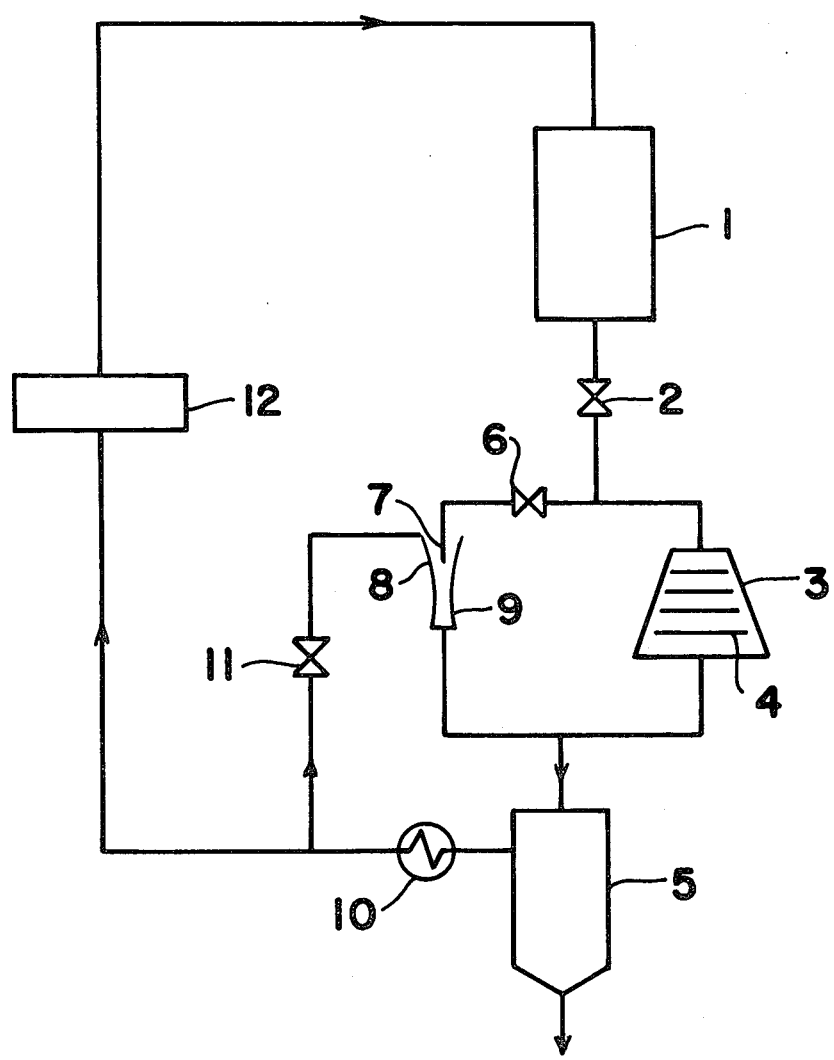
FIG. 1 is a schematic flow diagram of an embodiment.

FIG. 1 is a schematic diagram of an embodiment of the apparatus according to the invention. The apparatus comprises a reactor 1, the outlet of which is connected to a turbine 3 by means of an expansion valve 2. The turbine 3 comprises several stages 4 and is connected to the inlet of a separator 5. The separator comprises an outlet at its lower end for discharging the polymer. From a point between valve 2 and turbine 3, a line arranged in parallel leads, through an expansion valve 6, to the ejection nozzle 7 of an injector further comprising a convergent zone 8 downstream from the nozzle 7 and a diffuser 9 at the downstream end of zone 8. The diffuser 9 is connected to the line extending from the turbine 3 to the separator 5. The gas outlet of separator 5 is connected through a heat exchanger 10 to the inlet of a compressor 12, the outlet of which is connected to the inlet of reactor 1. At the outlet of the exchanger 10, a line arranged in parallel leads to the convergent zone 8 through an expansion valve 11.

What we claim is:

1. A process for the manufacture of polyethylene and for the production of energy, comprising the steps of:
   (a) reacting ethylene in at least one reactor under a pressure of 800 to 2,500 bars and at a temperature of 150° C. to 350° C., thereby producing a first mixture of polyethylene and unreacted ethylene;
   (b) expanding said first mixture to a lower pressure in an expansion valve;
   (c) dividing said first mixture into a second mixture comprising ethylene and polyethylene and a third mixture comprising ethylene and polyethylene;
   (d) expanding said second mixture to a lower pressure in an expansion valve;
   (e) passing said expanded second mixture through an ejector comprising an ejection zone, a mixing zone, and a diffusion zone to form a first separation mixture;
   (f) expanding said third mixture in a turbine comprising at least one stage succesively comprising a fixed nozzle and a bladed wheel, thereby producing energy for use outside said process and a second separation mixture;
   (g) combining said first separation mixture and said second separation mixture to form a final separation mixture;
   (h) removing substantially all polyethylene from said final separation mixture;
   (i) compressing the ethylene from said final separation mixture without using any energy derived from said turbine; and
   (j) recycling said compressed ethylene to step (a).

2. A process for the manufacture of polyethylene and for the production of energy, comprising the steps of:
   (a) reacting ethylene in at least one reactor under a pressure of 800 to 2,500 bars and at a temperature of 150° C. to 350° C. thereby producing a first mixture of polyethylene and unreacted ethylene;
   (b) expanding said first mixture to a lower pressure in an expansion valve;
   (c) dividing said first mixture into a second mixture comprising ethylene and polyethylene and a third mixture comprising ethylene and polyethylene;
   (d) expanding said second mixture in an expansion valve thereby forming a first separation mixture;
   (e) expanding said third mixture in a turbine comprising at least one stage successively comprising a fixed nozzle and a bladed wheel, thereby producing energy for use outside said process;
   (f) passing the effluent from said turbine through an ejector comprising an ejection zone, a mixing zone, and a diffusion zone, thereby producing a second separation mixure;
   (g) combining said first separation mixture and said second separation mixture to form a final separation mixture;
   (h) removing substantially all polyethylene from said final separation mixture;
   (i) compressing the ethylene from said final separation mixture without using any energy derived from said turbine; and
   (j) recycling said compressed ethylene to step (a).

3. The process of claim 1 further comprising the step of: (a) feeding fresh ethylene to said ejection zone for mixing with said expanded second mixture, thereby forming said first separation mixture.

4. The process of claim 1, further comprising the steps of: (a) cooling the ethylene from said final separation mixture, after removing substantially all polyethylene from said final separation mixture, before said ethylene is compressed; and (b) feeding part of said cooled ethylene to said ejection zone for mixing with said expanded second mixture, thereby forming said first separation mixture.

5. The process of claim 2, further comprising the step of: (a) feeding fresh ethylene to said ejection zone for mixing with said effluent from said turbine, thereby forming said second separation mixture.

6. The process of claim 2, further comprising the steps of: (a) cooling the ethylene from said final separation mixture, after removing substantially all polyethylene from said final separation mixture, before said ethylene is compressed; and (b) feeding part of said cooled ethylene to said ejection zone for mixing with said effluent from said turbine, thereby forming said second separation mixture.

7. The process of claim 2, wherein said turbine comprises a single stage, and wherein the neck cross-section S of the nozzle of said turbine is such that $$\frac{Q}{S} = \frac{P + 230}{2,160},$$

P being the pressure of the mixture leaving the reactor and entering the turbine and being expressed in atmospheres, S in square millimeters and Q in metric tons per hour.

8. The process of claim 2, wherein the turbine is a radial-inflow turbine having a reaction ratio which is less than or equal to $\frac{1}{2}$.

9. A process according to claim 2, wherein said turbine has a single quasi-radial jet.

10. A process according to claim 2, wherein said turbine is an axial-flow impulse turbine.

11. A process according to claim 10, wherein the angle of injection of the mixture through said nozzle, relative to said bladed wheel, is less than 30 degrees.

12. A process according to claim 2, wherein said nozzle is of the convergent-divergent type, in which the ratio of the outlet cross-section S' of the divergent part to the neck cross-section S is between 1 and 2.

13. The process of claim 2, wherein ethylene is injected into said injection zone under a pressure between 20 and 180 bars.

14. The process of claim 1, wherein ethylene is injected into said ejection zone under a pressure between 20 and 180 bars.

15. A process according to claim 1, wherein the turbine comprises a single stage, and wherein the neck cross-section S of the nozzle of said turbine is such that $$\frac{Q}{S} = \frac{P + 230}{2,160},$$

P being the pressure of the mixture leaving the reactor and entering the turbine and being expressed in atmospheres, S in square millimeters and Q in metric tons per hour.

16. A process according to claim 1, wherein the turbine is a radial-inflow turbine having a reaction ratio which is less than or equal to $\frac{1}{2}$.

17. A process according to claim 1, wherein said turbine has a single quasi-radial jet.

18. A process according to claim 1, wherein said turbine is an axial-flow impulse turbine.

19. A process according to claim 18, wherein the angle of injection of the mixture through said nozzle, relative to said bladed wheel, is less than 30 degrees.

20. A process according to claim 1, wherein said nozzle is of the convergent-divergent type, in which the ratio (S'/S) of the outlet cross-section S' of the divergent part to the neck cross-section S is between 1 and 2.

* * * * *